(12) United States Patent
Vangala et al.

(10) Patent No.: US 8,868,130 B2
(45) Date of Patent: Oct. 21, 2014

(54) APPARATUS AND METHODS FOR STATE SUSPENSION IN HYBRID NETWORKS

(71) Applicant: Apple Inc., Cupertino, CA (US)

(72) Inventors: Sarma V. Vangala, Cupertino, CA (US); Swaminathan Balakrishnan, Cupertino, CA (US); Chandra S. Chetty, Cupertino, CA (US); Viswanath Nagarajan, Cupertino, CA (US); Vikram B. Yerrabommanahalli, Sunnyvale, CA (US)

( * ) Notice: Subject to any disclaimer, the term of this patent is extended or adjusted under 35 U.S.C. 154(b) by 0 days.

(21) Appl. No.: 13/860,406

(22) Filed: Apr. 10, 2013

(65) Prior Publication Data

US 2014/0080479 A1 Mar. 20, 2014

Related U.S. Application Data

(60) Provisional application No. 61/622,453, filed on Apr. 10, 2012.

(51) Int. Cl.
| | |
|---|---|
| *H04M 1/00* | (2006.01) |
| *H04W 24/02* | (2009.01) |
| *H04W 88/06* | (2009.01) |
| *H04W 36/00* | (2009.01) |
| *H04W 76/04* | (2009.01) |
| *H04W 76/02* | (2009.01) |
| *H04W 76/06* | (2009.01) |

(52) U.S. Cl.
CPC .......... *H04W 24/02* (2013.01); *H04W 36/0088* (2013.01); *H04W 76/046* (2013.01); *H04W 76/026* (2013.01); *H04W 76/068* (2013.01); *H04W 76/028* (2013.01); *H04W 88/06* (2013.01)
USPC .................. 455/552.1; 455/414.1; 455/426.1; 455/436

(58) Field of Classification Search
CPC ..... H04W 24/10; H04W 88/06; H04W 48/18; H04W 56/00; H04W 36/0088; H04W 36/0094; H04W 76/028; H04W 76/068; H04W 76/064
USPC ........ 455/403, 414.1, 426.1, 426.2, 527, 528, 455/550.1, 552.1, 553.1, 435.1, 436, 437, 455/438

See application file for complete search history.

(56) References Cited

U.S. PATENT DOCUMENTS

| 8,738,021 B2* | 5/2014 | Mutya et al. ............... 455/452.1 |
| 2005/0159161 A1* | 7/2005 | Florkey et al. ................ 455/450 |
| 2008/0162637 A1* | 7/2008 | Adamczyk et al. ........... 709/204 |

(Continued)

FOREIGN PATENT DOCUMENTS

| WO | 2010/138634 | 12/2010 |
| WO | 2011/109750 | 9/2011 |
| WO | 2012/162190 | 11/2012 |

OTHER PUBLICATIONS

PCT Application No. PCT/US2013/036018—International Search Report and Written Opinion dated Aug. 19, 2013.

*Primary Examiner* — Jean Gelin
(74) *Attorney, Agent, or Firm* — Womble Carlyle Sandridge & Rice, LLP (57) ABSTRACT

Methods and apparatus for suspending session state during hybrid network operation. In one exemplary embodiment, a cellular device uses a single-radio solution to support circuit-switched calls on a CDMA 1X network and packet-switched calls on LTE. Periodically, the cellular device tunes away from LTE and monitors CDMA 1X activity, and vice versa. During these tuned-away periods, the client device may suspend operation on the tuned away network for extended tune away intervals.

25 Claims, 6 Drawing Sheets

(56) References Cited

U.S. PATENT DOCUMENTS

2009/0161627 A1* 6/2009 Ekambaram et al. ......... 370/331
2009/0279517 A1 11/2009 Chin et al.
2011/0130137 A1* 6/2011 Sanders et al. ................ 455/424
2012/0028661 A1 2/2012 Fang et al.
2012/0294173 A1* 11/2012 Su et al. ........................ 370/252
2014/0126522 A1* 5/2014 Ramasamy et al. .......... 370/329

* cited by examiner

APPARATUS AND METHODS FOR STATE SUSPENSION IN HYBRID NETWORKS

PRIORITY

This application claims priority to co-owned and U.S. Provisional Application Ser. No. 61/622,453 of the same title filed Apr. 10, 2012, which is incorporated herein by reference in its entirety.

RELATED APPLICATIONS

This application is related to co-owned, co-pending U.S. patent application Ser. No. 13/475,482 filed on May 18, 2012, and entitled "APPARATUS AND METHODS FOR CLIENT SERVER INTERACTION IN HYBRID NETWORK ENVIRONMENTS", Ser. No. 13/475,655 filed on May 18, 2012, and entitled "APPARATUS AND METHODS FOR OPTIMIZING SCHEDULED OPERATIONS IN HYBRID NETWORK ENVIRONMENTS", Ser. No. 13/475,802 filed May 18, 2012, and entitled "APPARATUS AND METHODS FOR NETWORK ASSISTED HYBRID NETWORK OPERATION", Ser. No. 13/346,419 filed Jan. 9, 2012, and entitled "DYNAMIC TRANSMIT CONFIGURATIONS IN DEVICES WITH MULTIPLE ANTENNAS", and Ser. No. 13/347,641 filed Jan. 10, 2012, Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", Ser. No. 13/347,641 filed Jan. 10, 2012 and entitled "MULTIMODE USER EQUIPMENT WITH DUAL CIRCUIT ARCHITECTURE". This application is also related to U.S. Provisional Patent Application Ser. Nos. 61/478,922 filed Apr. 25, 2011, and entitled "DUAL NETWORK MOBILE DEVICE RADIO RESOURCE MANAGEMENT", 61/472,617 filed Apr. 6, 2011, and entitled "MULTIPLE NETWORK MOBILE DEVICE CONNECTION MANAGEMENT", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to operation within heterogeneous wireless systems such as, for example, hybrid network operation during which client devices can communicate using any one of several networks. More particularly, in one exemplary embodiment, the present disclosure is directed to methods and apparatus for suspending session state during hybrid cellular network operation.

2. Description of Related Technology

A wireless (e.g., cellular) network operator provides mobile telecommunications services to the public via a network infrastructure of e.g., cellular base stations (BS), base station controllers, infrastructure nodes, etc. There are a wide variety of cellular network technologies. However, historically cellular devices have been specialized for operation within a single cellular network. However, as cellular technologies have become increasingly commoditized, devices are now able to offer so-called "multimode" operation; i.e., a single device that is capable of operation on two or more cellular networks. Multimode operation allows a device to operate on any one of several network technologies, but does not enable operation on multiple network technologies simultaneously.

For example, in the last few years, Long Term Evolution (LTE) has become the dominant choice for Fourth Generation (4G) cellular network technologies. LTE is standardized under the Third Generation Partnership Project (3GPP); existing LTE networks comply with so-called Release 8 requirements, incipient research is directed to future enhancements for subsequent releases (e.g., Release 9, Release 10, etc.). Code Division Multiple Access 2000 (CDMA2000) cellular technologies are standardized under the Third Generation Partnership Project Two (3GPP2). While LTE enables significant improvements for data services, existing LTE networks do not provide adequate support for voice services; thus, 3GPP2 network operators that have deployed CDMA2000 networks will continue to use CDMA2000 for voice services, while additionally supporting LTE networks for high speed data services.

Incipient research is directed to so-called "hybrid" network operation. During hybrid network operation, the client device operates simultaneously among multiple distinct networks having different technologies. In one exemplary case, a hybrid device can support both: (i) Long Term Evolution (LTE) and (ii) Code Division Multiple Access 1X (CDMA 1X) networks; i.e., the device can maintain a simultaneous connection between a first LTE network and a second CDMA 1X network. For example, a LTE/CDMA 1X hybrid device can conduct a voice call over the CDMA 1X network while the mobile device is in LTE mode. In another exemplary case, a hybrid device can support both: (i) CDMA 1X-EVDO (Evolution Data Optimized) and (ii) CDMA 1X networks.

Existing solutions for hybrid network operation rely on the client device to manage its own operation between networks. Specifically, the client device is responsible for maintaining its active connections to the various service networks so as to minimize the required changes to existing network installations (i.e., hybrid network operation ideally will minimally affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid operation are also capable of normal operation.

However, since existing solutions for hybrid network operation do not require the constituent networks to coordinate with one another, the client device will inevitably experience certain scheduling collisions. For example, a mobile device with a single RF front end can be attached to a first LTE network, but it must periodically "tune out" the LTE network to perform CDMA 1X actions (such as decoding the Quick Paging Channel (QPCH) to determine if the device is being paged). Since the LTE network is unaware of the client device's tuned away operation, if the LTE network attempts to access the device and the device is repeatedly unresponsive, the LTE network will drop the connection to the device (e.g., deleting the device's current context information, and running applications). Other solutions may use more hardware; for instance, a client device that has two (2) RF front ends can simultaneously and independently connect to both technologies. However, each additional RF front end requires additional hardware, which is expensive and may impact the overall device size.

Unfortunately, extant client devices and/or networks are only configured to handle relatively short periods of poor reception. Specifically, existing LTE networks are unable to distinguish between a tune away event, and other reception loss conditions (e.g., a long deep fade, etc.). For this reason, LTE networks only resume operation when the client device is only non-responsive for a few milliseconds. For reasons described in greater detail hereinafter, short time intervals do not provide enough time to perform certain network operations.

Accordingly, there is a salient need for methods and apparatus for state suspension and/or state exchange (between devices) in hybrid radio networks.

SUMMARY

The present disclosure provides, inter alia, apparatus and methods for suspending session state and/or exchanging state information during hybrid network operation.

A method for suspending session state during hybrid network operation is disclosed. In one embodiment, the method includes: identifying an extended outage event; providing information regarding the extended outage event to a first network; suspending a session with the first network for the duration of the extended outage event; and resuming the session with the first network after the extended outage event.

An apparatus capable of suspending session state during hybrid network operation is disclosed. In one embodiment, the apparatus is a network-based entity (e.g., server) which communicates with one or more client devices. In another embodiment, the apparatus is a mobile device (such as a smartphone or tablet computer). In yet another embodiment, the apparatus includes functionality distributed on both a network entity (e.g., server) and one or more mobile devices.

A computer-readable storage apparatus is disclosed. In one embodiment, the apparatus includes a storage medium having at least one computer program stored thereon, the at least one program being configured to, when executed, identify an extended outage event; provide information regarding the extended outage event; suspend a session between a client device and a first network for the duration of the extended outage event; and resume the session after the extended outage event.

A hybrid network system is disclosed. In one embodiment, the system includes at least two networks, and at least one network of the hybrid network system suspends one or more of its tasks while a client device is tuned to one or more others of the at least two networks.

A client device capable of hybrid network operation is disclosed.

A method of optimizing hybrid network operation so as to e.g., avoid scheduling collisions, is disclosed.

A method for operating a user equipment (UE) device in at least a first network is disclosed. In one embodiment, the method includes: identifying an extended outage event; providing information regarding the extended outage event to the first network; suspending a session with the first network for the duration of the extended outage event; and resuming the session with the first network after the extended outage event.

In one variant, the identifying the extended outage event is based at least in part on an operation of the UE device within a second network. In one such case, the operation is selected from one of: a data transmission on the second network, a data reception on the second network, and a measurement of a functional parameter of the second network. In another case, the operation includes at least one of (i) a registration with the second network, (ii) a location area update with the second network, (iii) an access of a paging channel of the second network, (iv) a search operation associated with the second network, (v) a measurement of a cell parameter of the second network, (vi) a voice call between the UE device and the second network, (vii) an out of service procedure; (viii) a power measurement associated with the second network, (ix) and overhead updates after moving to a different channel (e.g., during hard handoffs, etc.).

In another variant, the identification of the extended outage event is initiated by the UE device. In some cases, the identification of the extended outage is based on a timer, and where the timer is started when the UE device tunes to a second network. Responsive to the timer expiring, the UE device tunes back to the first network to provide the information regarding the extended outage event.

In another variant, the identification of the extended outage event is initiated by the first network. Alternately, the identification of the extended outage is based on one or more data communicated via a second network.

In some variants, the method includes suspending the session includes the UE device and the first network storing one or more device context information. In certain examples, the device context information includes one or more of: a UE device status; a UE connection status; one or more active applications of the UE device; one or more UE application states; one or more UE application histories; one or more UE application transactions; one or more UE download histories; and one or more UE upload histories. In still other cases, the session includes the UE device and the first network restoring the stored one or more device context information.

A portable radio communications apparatus is disclosed. In one embodiment, the portable radio communications apparatus includes: a processor; a timer, the timer configured to expire after a timer interval; a wireless interface; and connection management logic in communication with the processor and the wireless interface. In one exemplary embodiment, the connection management logic is configured to execute an extended outage event process, the extended outage event process causing the processor to: communicate with a first network via a session; tune to a second network and start the timer; and when the timer expires: tune back to the first network; suspend the session with the first network for a duration of an extended outage event; communicate with a second network during the extended outage event; and thereafter, resume the session with the first network.

A non-transitory computer-readable apparatus including a plurality of computer readable instructions stored thereon is disclosed. In one embodiment, the instructions are configured to, when executed by a processor, cause a mobile device to: establish a communications session with the first network; while the communications session is active, tune to a second network; when an extended outage event occurs while the mobile device is tuned to the second network; provide information regarding the extended outage event to the first network; suspend the communications session with the first network; and when the extended outage event finishes, resume the suspended communications session with the first network.

A method of operating a base station of a hybrid network, where the hybrid network includes a first network technology portion and a second network technology portion, is disclosed. In one embodiment, the method includes: receiving extended outage event information regarding a session associated with a wireless device connected to the first network technology portion; suspending the session for a duration based on the extended outage event information; and resuming the session after the duration.

In one variant, the extended outage event information is based on a schedule associated with the wireless device and the second network technology portion.

In a second variant, the suspending the session includes storing at least one or more of: a device status; a device connection status; one or more currently active applications of the device; one or more device application states; one or more device application histories; one or more device application transactions; one or more device download histories; and one or more device upload histories.

In a third variant, the received extended outage event information is received via an extended service request message transmitted from the wireless device.

A wireless base station apparatus is disclosed. In one embodiment, the wireless base station apparatus includes: at least one wireless cellular interface; a server apparatus; and logic in data communication with the at least one wireless cellular interface and the server apparatus, and configured to facilitate operation of one or more user equipment (UE) within a first network and a second network. In one variant, the logic is configured to: identify an extended outage event corresponding to a device associated with a communication session within the first network; based on one or more data provided by the device, store one or more information associated with the communication session; and based on a resume indication and the one or more data, restore the communication session.

A non-transitory computer readable apparatus storing a plurality of computer readable instructions is disclosed. In one embodiment, the instructions are configured to, when executed cause a base station device to: establish a communication session with a client device; identify an extended outage event associated with the client device; suspend the communication session based on one or more device context data provided by the client device; and based on a resume indication, restore the communication session based on the one or more context data.

Other features and advantages of the present disclosure will immediately be recognized by persons of ordinary skill in the art with reference to the attached drawings and detailed description of exemplary embodiments as given below.

All Figures © Copyright 2012-2013 Apple Inc. All rights reserved.

DETAILED DESCRIPTION OF THE DISCLOSURE

Reference is now made to the drawings, wherein like numerals refer to like parts throughout.

Detailed Description of Exemplary Embodiments

Exemplary embodiments of the present disclosure are now described in detail. While these embodiments are primarily discussed in the context of Long Term Evolution (LTE), Code Division Multiple Access 1X (CDMA 1X) cellular networks, and CDMA 1X EVDO (Evolution Data Optimized), it will be recognized by those of ordinary skill that the present disclosure is not so limited, and can be used with other cellular technologies such as TD-LTE (Time-Division Long-Term Evolution), TD-LTE-Advanced, TD-SCDMA (Time Division Synchronous Code Division Multiple Access) and Global System for Mobile Communications (GSM). In fact, the various embodiments of the disclosure are useful in combination with any network (cellular, wireless, wireline, or otherwise) that can benefit from suspending session state during extended outage event operation.

Exemplary LTE/CDMA 1X Hybrid Network Operation—

Figure 1:
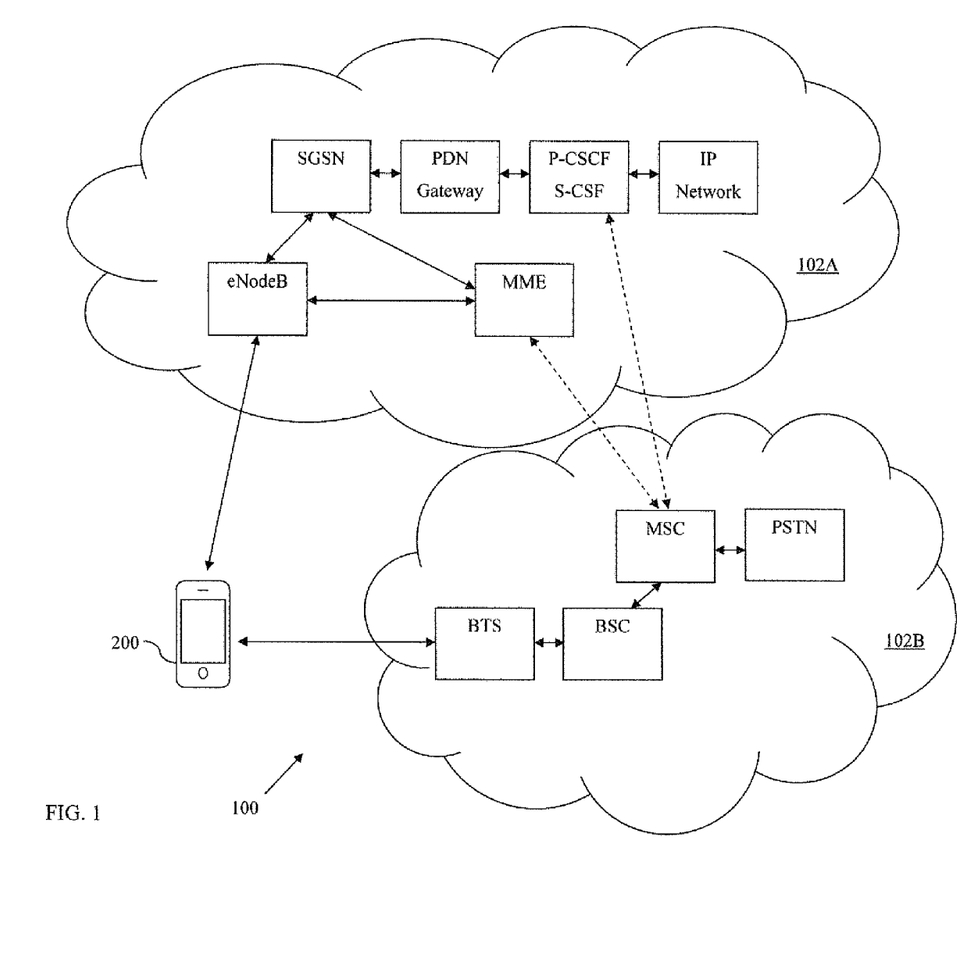
FIG. 1 is a logical block diagram illustrating one exemplary hybrid network system useful in conjunction with the present disclosure.

Hybrid networks are composed of multiple radio access networks (RANs) which are coupled in varying degrees to provide service to a population of devices. There may be varying degrees of coordination between networks. For example, FIG. 1 illustrates an exemplary hybrid network system 100 that includes a first LTE RAN (radio access network) 102A and a second CDMA 1X RAN 102B in communication with a user equipment (UE) client device 200. The degree to which the first LTE RAN, the second CDMA 1X RAN, and the UE are able to coordinate operation is largely determined by how tightly coupled the RANs are. Tightly coupled RANs may share information (e.g., paging information, registration, etc.). Loosely coupled networks may share some information, but remain largely independent. Completely uncoupled networks operate without any coordination whatsoever.

One example of tightly coupled hybrid networks includes networks that support so-called Circuit Switched Fall Back (CSFB) operation. In one exemplary CSFB capable hybrid network, the CDMA 1X RAN coordinates with the LTE RAN for paging message delivery. Specifically, the CDMA 1X RAN can deliver paging messages to the UE via tunneled signaling through the LTE network. If the UE receives a CDMA 1X network page while connected to the LIE network, the UE will "fall back" to the CDMA 1X network. CSFB networks require significant coordination between the CDMA 1X and LTE RANs, thus CSFB is not widely deployed; most CDMA 1X and LTE networks operate independently.

For this reason, significant research has been directed to solutions for uncoupled networks (and/or loosely coupled networks). In uncoupled networks, the client device has a significant burden in managing network operation on multiple networks. Generally, the client device can either maintain multiple active radios (one for each network), or alternately the client device may time multiplex operation for individual networks. For example, in a dual radio embodiment, a UE simultaneously operates on both networks, using the LTE network for data services and the CDMA 1X network for voice services. The dual radio UE concurrently operates a first CDMA 1X modem and a second LTE modem. Those of ordinary skill in the related arts will recognize that simultaneous operation of both radios consumes a significant amount of power with limited benefits. While dual radio UE operation can transact both data and voice at the same time, concurrent voice and data applications are less commonly used (i.e., typically a user uses voice, or data, not both at the same time).

Accordingly, in one exemplary embodiment of the present disclosure, a UE implements a time multiplexed scheme for handling the multiple networks. During operation, the device alternates between LTE and CDMA 1X to support both data and voice services. Specifically, the device primarily monitors LTE for data related operations, however it periodically tunes away to the CDMA 1X network to receive paging messages. In this scheme, the UE can leverage the high data capabilities of the LTE network, while also providing acceptable capabilities for voice services on the CDMA 1X network.

Figure 2:
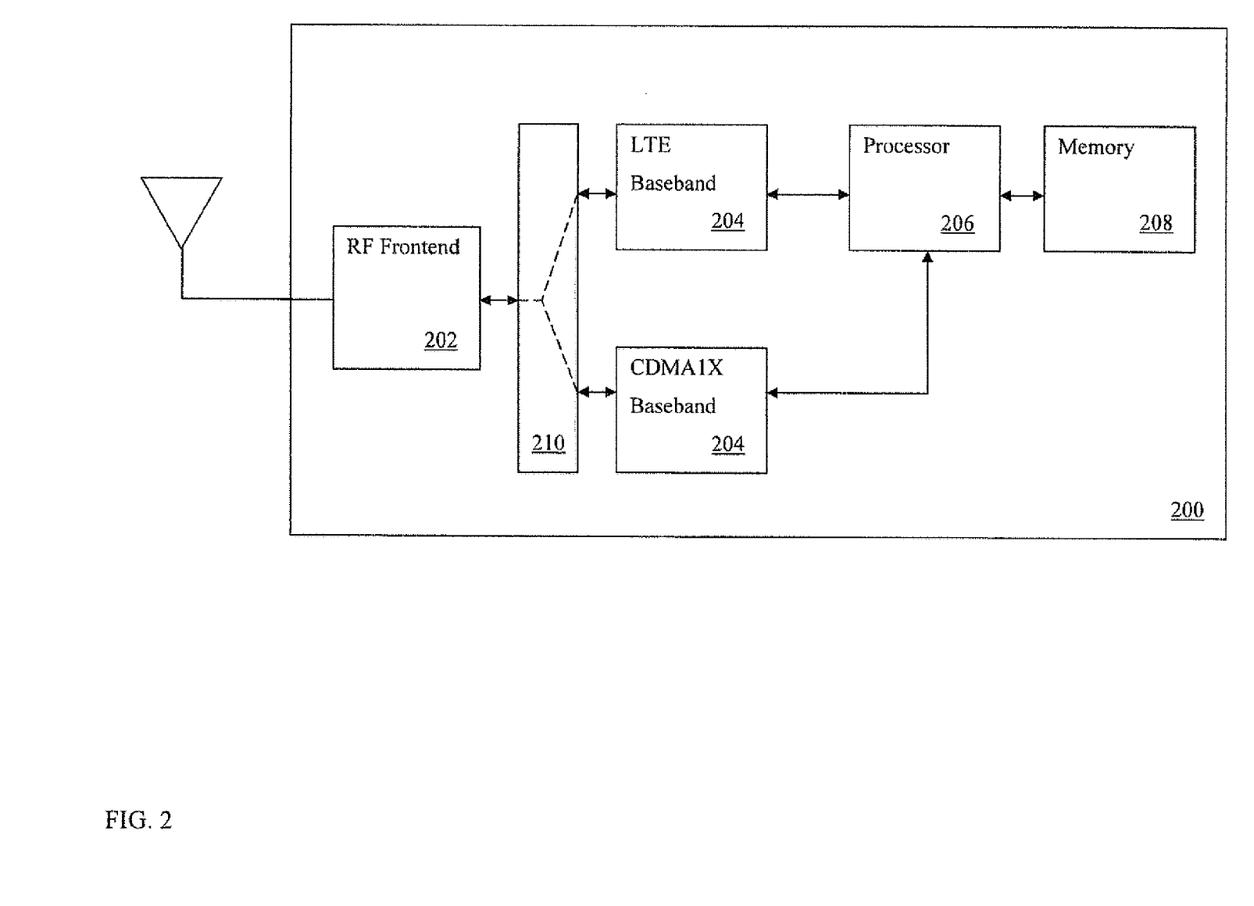
FIG. 2 is a functional block diagram of an exemplary embodiment of user equipment (UE) apparatus configured according to the present disclosure.

Referring now to FIG. 2, the exemplary user equipment (UE) apparatus 200 is illustrated in greater detail. The UE of FIG. 2 is a single-radio solution to support circuit-switched calls on a CDMA 1X network and packet-switched calls on LTE; specifically, the UE has a single Radio Frequency (RF) processing "chain" which is used alternately for CDMA 1X or LTE processing. Specifically, the single RF chain periodically tunes away from LTE and monitors CDMA 1X activity, and vice versa. The UE includes: (i) one or more Radio Frequency (RF) front-ends 202 (in some embodiments, multiple RF front-ends may be used to support other radio access technologies, etc.), (ii) one or more baseband processors 204, and (iii) at least one application processor 206 and associated memor(ies) 208. In various implementations, the RE front-ends and baseband processors may be further specialized to handle a single wireless technology, or generalized to encompass multiple wireless technologies.

As shown, the exemplary UE includes a first RF front-end that is coupled to both first and second baseband processors adapted to interface to a LTE network and CDMA 1X network, respectively. It is further appreciated that the foregoing configuration is purely illustrative, and various implementations may include other cellular technologies such as GSM, GPRS, EDGE, WCDMA, CDMA2000, CDMA 1X EVDO, LTE-A (LTE Advanced), etc. in various combinations. Moreover, while only a single RF front-end is shown for simplicity, it is appreciated that a RF front-end can (and generally will) include multiple receive and/or transmit antennas and/or chains. For example, well known MIMO (Multiple In Multiple Out), SISO (Single In Single Out), MISO (Multiple In Single Out), and SIMO (Single In Multiple Out) antenna configurations are widely used within the related arts, and may be used consistent with the present disclosure.

Additionally, in one exemplary embodiment of the present disclosure, the UE 200 further includes a switching fabric 210 that can connect any one (or more) of the baseband processors 204 to various one (or more) of the antennas 202. The illustrated switching fabric is adapted to connect either the LTE baseband or CDMA 1X baseband to the RF front-end. However, common embodiments may connect one baseband processor to one antenna ("one-to-one"), one-to-many, many-to-one, one-to-subset, and/or other mappings. This "switching" capability is desirable for a number of reasons, including for example: (i) power management, (ii) processing efficiency/flexibility, and (iii) antenna isolation constraints may require that only a subset of radios of a mobile device are active at any one time. In some small form factor designs, there is not enough space to completely isolate multiple antennas during operation; consequently, only one antenna can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, and/or other considerations).

Moreover, it will be appreciated that other components are commonly incorporated within UE 200, but are not discussed further herein. For example, the UE may include user interface (UI) components (display screens, buttons, touch screens, dials, and/or other UI components), memory components (e.g., RAM (Random Access Memory), Flash, hard disk drives (HDD), and/or other storage elements), power management components (e.g., batteries, charger components, and/or other components), and external interfaces (e.g., FireWire™, Universal Serial Bus™ (USB), Thunderbolt, and/or other interfaces.)

Furthermore, it should be recognized that the UE depicted in FIG. 2 is merely illustrative of one exemplary embodiment. Still other variants are described with greater detail in co-owned and U.S. Provisional Patent Application Ser. Nos. 61/478,922 filed Apr. 25, 2011, and entitled "DUAL NETWORK MOBILE DEVICE RADIO RESOURCE MANAGEMENT", and 61/472,617 filed Apr. 6, 2011, and entitled "MULTIPLE NETWORK MOBILE DEVICE CONNECTION MANAGEMENT" and U.S. patent application Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", Ser. No. 13/346,419 filed Jan. 9, 2012, and entitled "DYNAMIC TRANSMIT CONFIGURATION IN DEVICES WITH MULTIPLE ANTENNAS", and Ser. No. 13/347,641 filed Jan. 10, 2012, and entitled "MULTIMODE USER EQUIPMENT WITH DUAL CIRCUIT ARCHITECTURE", each of the foregoing being incorporated herein by reference in its entirety.

The exemplary UE 200 of FIG. 2 is capable of LTE/CDMA 1X hybrid mode operation within, e.g., the hybrid network system of FIG. 1. Specifically, the UE 200 can place CDMA 1X voice calls while registered with the LTE network. During hybrid operation, the UE can be registered to both a LTE network 102A and a CDMA 1X network 102B. The UE is capable of receiving and responding to data and control messaging from either the LTE network or the CDMA 1X network; however, as previously discussed, the UE cannot respond simultaneously to both networks, and always prioritizes CDMA 1X (voice call) traffic over LTE (data) traffic to ensure that user experience for voice calls is unaffected. Other implementations may have other prioritization schemes (e.g., where voice calls are lower priority, based on the type of traffic, historic device usage, and/or other parameters)

As a brief aside, hybrid device software architecture is may be separated into at least two types of entities: a call management (CM) entity, and one or more call processing (CP) entities.

The CM entity is responsible for managing the communications protocol aspects of a call, as well as determines which portion of the protocol stack needs to be active. The CP entities are responsible for the particular sequence of events needed to establish, maintain, and terminate a call. In one exemplary embodiment, the CM software is executed as a portion of the hybrid device's Operating System (OS). The CM software may manage to which network the hybrid device is currently tuned, determine which data sessions are active/inactive, and/or perform other communications management functionality. While the CM manages the hybrid device high level operation, the details of actual network operation are handled within the CP entities.

Each network has a corresponding CP; thus, for a LTE/CDMA 1X hybrid device, there is an LTE CP and a CDMA 1X CP. In typical implementations, the CP includes the call stack software for each network (e.g., Medium Access Control (MAC) Layer, Link Layer, and Physical layer (PHY), and/or other layers). The CP entities are responsible for communicating with their peer network CP entities (e.g., the client MAC communicates with the network MAC, etc.).

Once the UE 200 has connected to the LTE network 102A, the UE may periodically "tune" its radio away from the LTE network to perform CDMA 1X maintenance actions such as acquiring a CDMA 1X cell, registering to the acquired CDMA 1X cell, and receiving CDMA 1X pages, and/or perform other actions Depending on CDMA 1X network 102B radio conditions, these actions can range in one exemplary implementation from eighty milliseconds (80 ms) up to several seconds (4 s-6 s) and even longer in some instances. Moreover, when the UE receives or places a voice call on the CDMA 1X network, the LTE connection may be dropped. As used hereinafter, the terms "tune-away", "tune-out", etc. are interchangeably used, and similarly the reciprocal terms "tune-in", "tune-back", etc. are interchangeably used. More generally, "tune-away" operation is subsumed in a larger group of client device reception outage events. Specifically, these client device reception outage events are initiated by the client device (with or without network coordination) to intentionally or indirectly disable reception of the client device to achieve some other purpose or goal. Common examples may include e.g., to perform measurements on other networks, to reduce power consumption, to reduce interference on other nearby devices, to preserve processing resources for other applications, and/or other perform other actions.

Referring back to the exemplary UE 200 of FIG. 2, there are several events that can trigger a tune-away event. Common examples include (without limitation): (i) registration, (ii) location updates, (iii) paging, (iv) search operations, (v) cell measurements, (vi) voice call events (both mobile originated (MO) (i.e., placed by the mobile device), and mobile terminated (MT) (i.e., received by the mobile device)), (vii) out of service (OOS) procedures, (viii) overhead updates after moving to a different channel (e.g., during hard handoffs), etc. Tune-away events may be periodic in nature (or otherwise predictably scheduled), or may be entirely unpredictable, interrupting events, or variants or combinations thereof. The duration of tune-away events widely varies from a few milliseconds to several seconds or longer.

For example, within this context, the UE may periodically tune-away from a LTE network to tune-in to the CDMA 1X network to detect a paging channel, and perform serving cell and neighbor cell measurements of the CDMA 1X network. More rarely, the tune-away event may require a substantially longer time interval to perform lengthy maintenance tasks. Over the course of normal operation, the mobile device periodically tunes to the CDMA 1X network for brief time intervals. Occasionally, the device must perform much lengthier tasks. Common examples of lengthier tasks include, without limitation, Location Area Updates (LAU) where the mobile device must actively exchange information with the CDMA 1X network, periods of poor reception (e.g., the mobile device may need additional time to decode messaging (e.g., paging channels, etc.)), network overhead updates, and/or system parameters changes, etc. Additionally, it is further appreciated, that during voice services (e.g., mobile originated (MO) (voice calls placed by the device), and mobile terminated (MT) calls (voice calls received by the device), etc.), the UE tunes away from the LTE network and handles the voice service via the CDMA 1X network.

As previously noted, extant client devices and networks are only configured to handle relatively short tune away periods. Existing LTE networks are unable to distinguish between a tune away event, and other reception loss conditions (e.g., a long deep fade, etc.). For a hybrid device, this relatively short time interval is only enough time to check a paging channel of the CDMA 1X network. This short time interval is not enough time for handoffs, reacquisition handoffs, registration requests, etc.

Consider a mobile device that has tuned away from an LTE network to decode the CDMA 1X paging channel and perform measurements. If the LTE network attempts to push data to the mobile device while it is tuned away, then the mobile device will appear to the LTE network to be unresponsive. The LTE network may attempt several times to deliver the data. When the LTE network exceeds a maximum number of retransmissions/retries (or another terminating condition or event is reached), the LTE network may consider the mobile device to be unavailable. Thereafter, the network may remove the mobile device from its list of active devices and purge the device context (e.g., currently active data sessions, etc.). When the mobile device subsequently resumes communications with the LTE network, the mobile device has to reinstate (or restart) its terminated data session(s). In some implementations, reinstatement may require significant additional messaging with the network to recover the previous state/data of the device and update its context to the current state.

More generally, unlike devices that require an independent radio for every supported technology, various embodiments of the present disclosure are directed to hybrid client devices that can accommodate these indeterminate periods of inactivity on one technology and/or indicate a "tune-away" period to the network. Constituent networks of a hybrid network should distinguish between mobile devices which are tuned away, and mobile devices which have poor reception. As described in greater detail hereinafter, "intentionally" initiated tune away events are explicitly (or implicitly) indicated.

Consequently, one salient embodiment of the present disclosure is directed to providing a network with information during tune away periods, such that the network can suspend device context (rather than discarding the device context, resulting in the device re-establishing its connection at a later point). Various embodiments of the present disclosure are directed to coordination between the client device and the constituent networks of a hybrid network. Specifically, the exemplary UE 200 is configured to suspend session state during hybrid network operation.

As used herein, "device context" and "session state" are interchangeably used to represent the information related to device status, connection status, currently active applications, application state, application history, application transactions, download history, upload history, and/or other parameters, etc. Moreover, it is appreciated that suspending the session state/device context does not necessarily result in an actual suspension of the e.g., device or network. Rather, during "suspension", the device and network store the current session state; similarly, during "resumption", the device and network restore the stored session state.

In one exemplary embodiment, the UE is configured to identify one or more extended outage events. During hybrid operation, the UE periodically tunes away from the LTE network to operate on a CDMA 1X network (e.g., perform power measurements, check paging channels, etc.). During the tune away period, the mobile device monitors a timer. If the timer expires before the UE has completed its CDMA 1X tasks, then the UE triggers an extended outage event. Once an extended outage event is identified, the UE tunes back to the LTE network and initiates a session suspension (i.e., existing communications and connection information is halted). Within the suspended state, the UE and LTE network can close any ongoing overhead communication which would otherwise be necessary to sustain an active communication link. Once the UE is ready to return to the LTE network, it can resume operation with its saved context.

It may be appreciated by those skilled in the arts that while exemplary implementations of the disclosure are described in terms of monitoring a timer, a temporal metric is but one possible consideration for entry into the extended outage state. For instance, a number of cycles or operations (such as via a counter, as described infra) could be monitored, as could a count of certain types of events. It may be the case that device context is associated with a non-temporal metric; e.g., state or context would be preserved for extended periods, or even indefinitely, unless a certain event or condition occurs, and hence a purely temporal metric would not capture this subtlety. Hence, the present disclosure contemplates both temporal and non-temporal metrics, whether used alone or in combination.

Also, while the foregoing scenario is discussed in relation to LTE/CDMA 1X capable client devices, it is further appreciated that similar (if not identical) complications arise in other hybrid client devices. For example, other mobile devices may be capable of Time-Division Long-Term Evolution (TD-LTE) and Time Division Synchronous Code Division Multiple Access (TD-SCDMA) technologies. In LTE (also referred to as Frequency Division Duplex LTE (FD-LTE)), the downlink and uplink are transmitted using different frequencies. In Time Division Duplex LTE (TD-LTE), the downlink and the uplink are on the same frequency and the separation occurs in the time domain, so that each direction in a call is assigned to specific timeslots.

Similarly, Time Division Synchronous Code Division Multiple Access (TD-SCDMA) allows traffic to be uplinked (from the mobile terminal to the base station) and downlinked (from the base station to the mobile terminal) using different time slots in the same frame.

Embodiments of the present disclosure contemplate the use of these technologies together and separately (in combination with other technologies) in a hybrid network. For example, in an exemplary embodiment relating to both TD-LTE and TD-SCDMA, a UE connected to the TD-LTE network will periodically (or on an event driven or other basis) tune its radio away from the TD-LTE network to perform TD-SCDMA actions such as cell selection, registration, and receiving pages.

Moreover, Global System for Mobile Communications (GSM) is a cellular technology standard that has evolved a number of advancements including General Packet Radio Service (GPRS), Enhanced Data rates for GSM Evolution (EDGE), and Universal Mobile Telecommunications System (UMTS) also known as 3G (Third Generation) UMTS. Various other common embodiments may further combine either LTE, or TD-LTE with any of GSM, GPRS, EDGE, UMTS, etc.

Methods—

Figure 3:
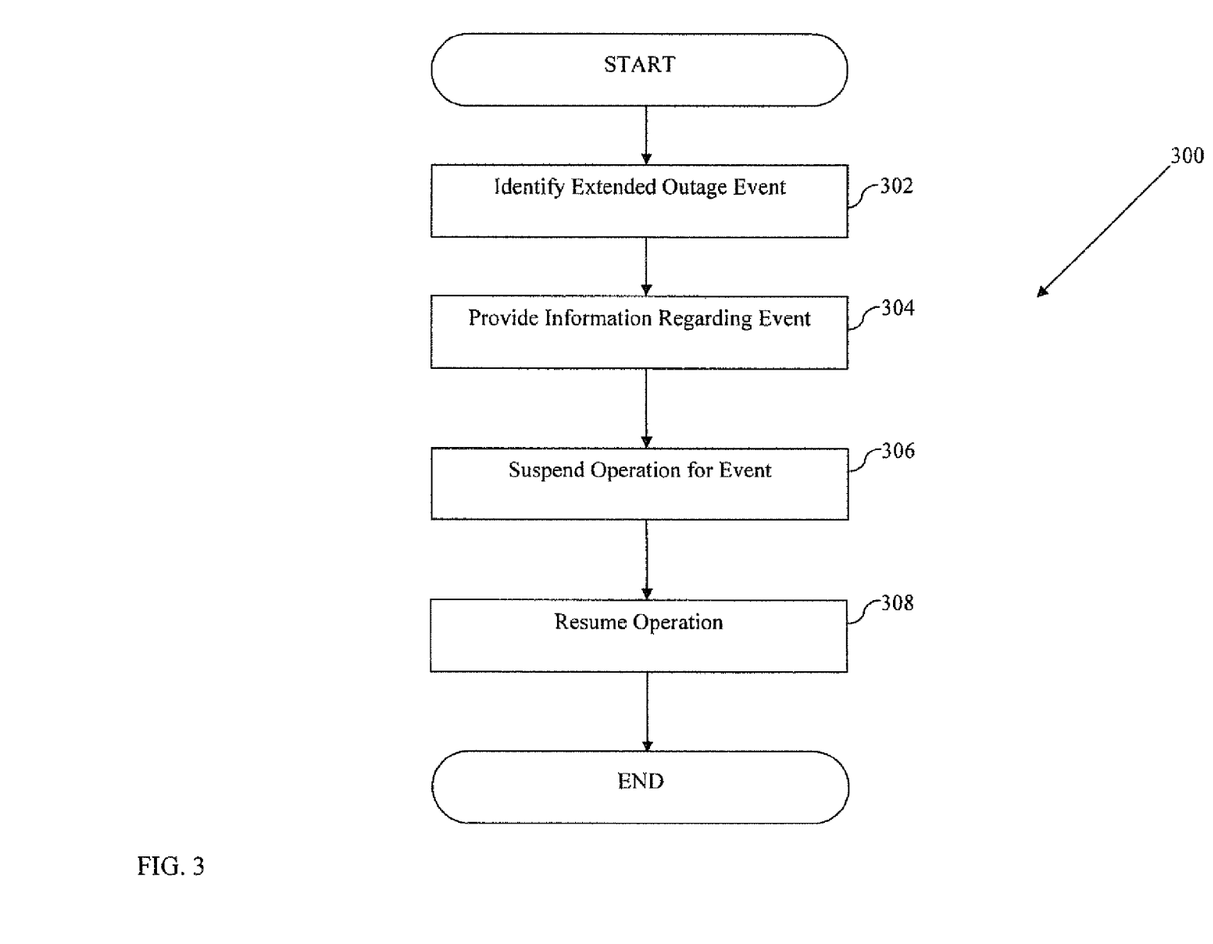
FIG. 3 is a logical flow diagram detailing one embodiment of a generalized method for suspending session state during hybrid network operation, in accordance with the present disclosure.

Referring now to FIG. 3, one embodiment of a generalized method 300 for suspending session state during hybrid network operation is illustrated. In one scenario, a client device is connected to a first network, where the first network is entirely unaware of the client device's connections to other networks. Alternatively, the first network may have limited information on nearby networks (e.g., timing information, registered devices, etc.) which may be periodically refreshed, but is not integrated within the operational decisions for the first network. For example, in one exemplary embodiment, a mobile device configured for single-radio operation on a Long Term Evolution (LIE) network and a CDMA 1X network, camps on a LTE network, and periodically tunes to the CDMA 1X network to receive voice calls.

At step 302 of the method 300, an extended outage event is identified. In one embodiment, the extended outage event is identified by the client device based on operation of one or more wireless networks. In other embodiments, the extended outage event is identified by the network based on e.g., non-responsive mobile behavior, network scheduled events (e.g., a first network may be able to identify an upcoming "long term" event to the mobile, the mobile can schedule behavior on a second network accordingly).

In one implementation, the extended outage event is based on timer expiration. Preferably the timer is selected short enough so as to minimize (or eliminate altogether) unintentional context termination; e.g., a mobile device can notify the network of an extended service request before the network purges the mobile device's data. In some cases, the timer is additionally selected long enough to minimize the number of unnecessary suspensions (each suspension requires a non-trivial amount of control overhead, thus extraneous suspensions should be minimized).

Various schemes for selecting an appropriate timer value can be implemented to maximize the overall benefit to suspension operation. For example, in some embodiments, timer selection is based on an optimization engine which is configured to ascribe various weights to various considerations and balance the overall weighted "cost" associated with purging UE data to the weighted "cost" associated with preemptive suspension. By determining the proper balance for timer selection, the optimization engine can maximize overall network operation. In other embodiments, timer selection may be based on a rules engine which is configured to identify certain conditions which satisfy a set of rules; the rule set dictates the selection of an appropriate timer value. For instance, a rule may dictate a particular timer value based on e.g., Quality of Service (QoS), application type, and user preference. Still other forms of timer value selection are readily recognized throughout the related arts.

In some embodiments, counters are used rather than timers. For example, certain networks may require periodic task scheduling (e.g., one (1) out of four (4) measurement cycles is a "long" measurement cycle, etc.), accordingly the mobile device can determine based on the counter value if an extended outage event is necessary. In still other examples, the network may determine non-responsive operation based on a running count of non-responsive attempts to contact the mobile device.

In one exemplary embodiment, a mobile device periodically tunes away from a first network to operate on a second network. During the tune away period, the mobile device monitors a timer. If the timer expires before the mobile device has completed its operations on the second network, then the mobile device triggers an extended outage event.

At step 304 of the method 300, information regarding the extended outage event is provided to both the client device and the first network. For example, where the client device has identified an extended outage event, the client device notifies the first network. Alternatively, when the first network has identified an extended outage event, the first network notifies the client device (this may be performed via an out-of-band communication link, Internet Protocol (IP) tunnel, etc.).

In one embodiment, the mobile device tunes back to the first network and provides the information via its existing connection. In other embodiments, the mobile device remains on the first network, and provides the information regarding the extended outage event via e.g., a tunnel mechanism through the second network. For example, the mobile device can tunnel to the first network via an IP tunnel through the second network. Similarly, the first network may be able to access the mobile device via an IP tunnel through the second network.

Common examples of information may include one or more of: fixed duration, likely duration (e.g., 60% chance return within a first time, 30% chance return within a second time, 10% chance of not returning, etc.), average duration (based on historic operation), relative priority, etc. Other types of information may include supported options e.g., network overrides (e.g., where a device is performing a relatively low priority measurement of a second network, the first network may be able to issue an override command, etc.), task related information, current state information, current context information, information which does not need to be kept (e.g., a memory "flush"), etc, At step 306 of the method 300, the client device and the first network suspend operation for the duration of the extended outage event. Once the client device and the first network are in agreement, together they transition to a suspended state. Within the suspended state, the client device and first network can close any ongoing overhead communication which would otherwise be necessary to sustain an active communication link. In one embodiment, the first network reclaims any resources previously in use by the client device.

At step 308 of the method 300, the client device and the first network resume operation. In one exemplary embodiment, the client device resumes operation with the first network based on a Random Access Channel (RACH) access. Specifically, once the extended outage event has concluded, the client device can transmit RACH attempts until the first network responds (see step 308). Alternately, for fixed duration extended outage events, the client device and network can resume operation once the fixed duration has expired (e.g., based on locally held timers).

In some embodiments, suspension data is occasionally cleaned for stale information. For example, consider a client device which suspended operation and has moved out of coverage of the first network. The context information associated with the client device will never be resumed (i.e., even where the client device returns to the network, it must re-initialize); if allowed to accumulate unchecked, the stale context information may overflow and may affect network server operation. Thus, in one embodiment, the network may maintain a secondary timer or other monitored metric to remove suspended context information which is likely no longer valid. In other embodiments, the network may simply drop suspension data according to a very large First In First Out (FIFO) buffer; i.e., new suspension data pushes the oldest suspension data off the FIFO. The depth of the FIFO is selected large enough to ensure that only stale information is pushed off.

Example Operation—

Figure 4:
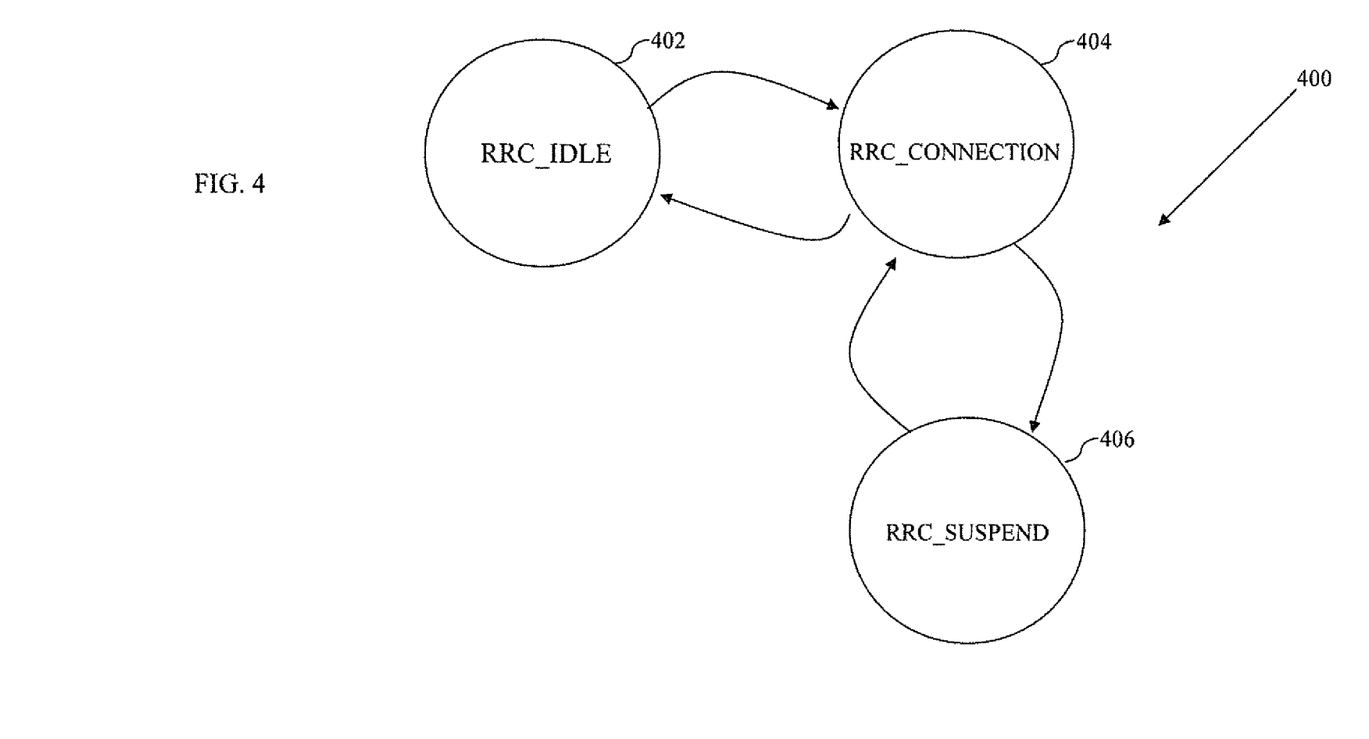
FIG. 4 is a graphical representation of one exemplary Radio Resource Connection (RRC) state machine useful in conjunction with various embodiments of the present disclosure.

Referring now to FIG. 4, one exemplary Radio Resource Connection (RRC) state machine useful in conjunction with various embodiments of the present disclosure is presented. Generally, both the client device and the network have complementary RRC state machines. The RRC state machines generally handle connection establishment and release; more specifically, each state of the RRC state machine dictates appropriate behavior for each entity (client device and network) so as to initialize a connection, and transact data. As shown, the state machine includes: a RRC_IDLE state 402, a RRC_CONNECTED state 404, and a RRC_SUSPEND state 406.

Before the client device can begin operation, it must first initiate access to the network, and complete authentication and authorization procedures. Once the client device has successfully registered with the network, the client device enters the RRC_IDLE state 402.

In the RRC_IDLE state 402, the client device and the network do not have a current context. The client device is registered with the network, but is accessible only via a paging channel (when initiated by the network), and can only initiate Random Access Channel (RACH) attempts. Responsive to receiving a page from the network, the client device will initiate a RACH attempt to establish a connection. The client device can also initiate a RACH attempt of its own volition (e.g., to place a call, request data service, etc.). Additionally, during RRC_IDLE mode, the client device performs regular measurements of the nearby cells to optimize its network reception.

In the RRC_CONNECTED state 404, the client device has an active dialog with the network. The client device and network can negotiate radio bearers, transact data, etc. If the client device does not have any outstanding transactions, then the client device is transitioned to RRC_IDLE. If the client device or the network are unresponsive for an extended period of time or behave aberrantly, then the RRC state machine is reset to the uninitialized state (i.e., the client device must re-register to enter RRC_IDLE).

Additionally, in one exemplary embodiment of the present disclosure, the RRC_CONNECTED state 404 can transition to the RRC_SUSPEND state 406. In one exemplary embodiment, if the client device requires an especially long tune away period, then it issues an extended service request to the network. Both the client device and the network transition to the RRC_SUSPEND state. Once the client device is prepared to resume network operation, it can issue a Random Access Channel (RACH) request. Thereafter, the context of the client device is restored, and the device can continue in RRC_CONNECTED state 404. As shown, the RRC_SUSPEND state is transitioned from the RRC_CONNECTED state; however it is appreciated that in other embodiments, RRC_SUSPEND may be transitioned to from RRC_IDLE (e.g., via out-of-band processes disclosed hereinafter).

Within RRC_SUSPEND, the client device and network each maintain a stored copy of the client device's current context. By storing client device context, but enabling extended out-of-service operation, the client device can handle virtually any tune away circumstance without unduly affecting the tuned away network. Additionally, because the device context is stored, resumption of service is much shorter than if the device were to start from scratch (normally the client device would be required to re-authenticate, re-authorize and re-register, etc.). For instance, a user equipment (UE) can tune away from a LTE network for an arbitrarily long time (e.g., to handle relatively long service operations on the CDMA 1X network), and resume its context immediately upon return.

While RRC_SUSPEND 406 can enable long tune away operations, it is appreciated that eventually device context should be removed. In particular, while a client device may tune away for a longer period, this time cannot be limitless.

For instance, it is not unreasonable to believe that a device may physically leave the coverage area during a tune away event. Keeping client device context for absent devices is an inefficient use of memory and/or other assets. Thus, in various implementations of the present disclosure, the RRC_SUSPEND is further configured to implement a secondary suspension timer. The suspension timer is selected long enough to cover many (if not all) long tune away periods, but not unreasonably so.

In other variants, the RRC_SUSPEND operation culls the oldest information on an as-necessary basis. In these embodiments, suspended context information is stored within a large repository; as the repository fills, the oldest information is deleted to make space for new information. For a sufficiently large repository, the culled information should only be very stale context information.

Figure 5:
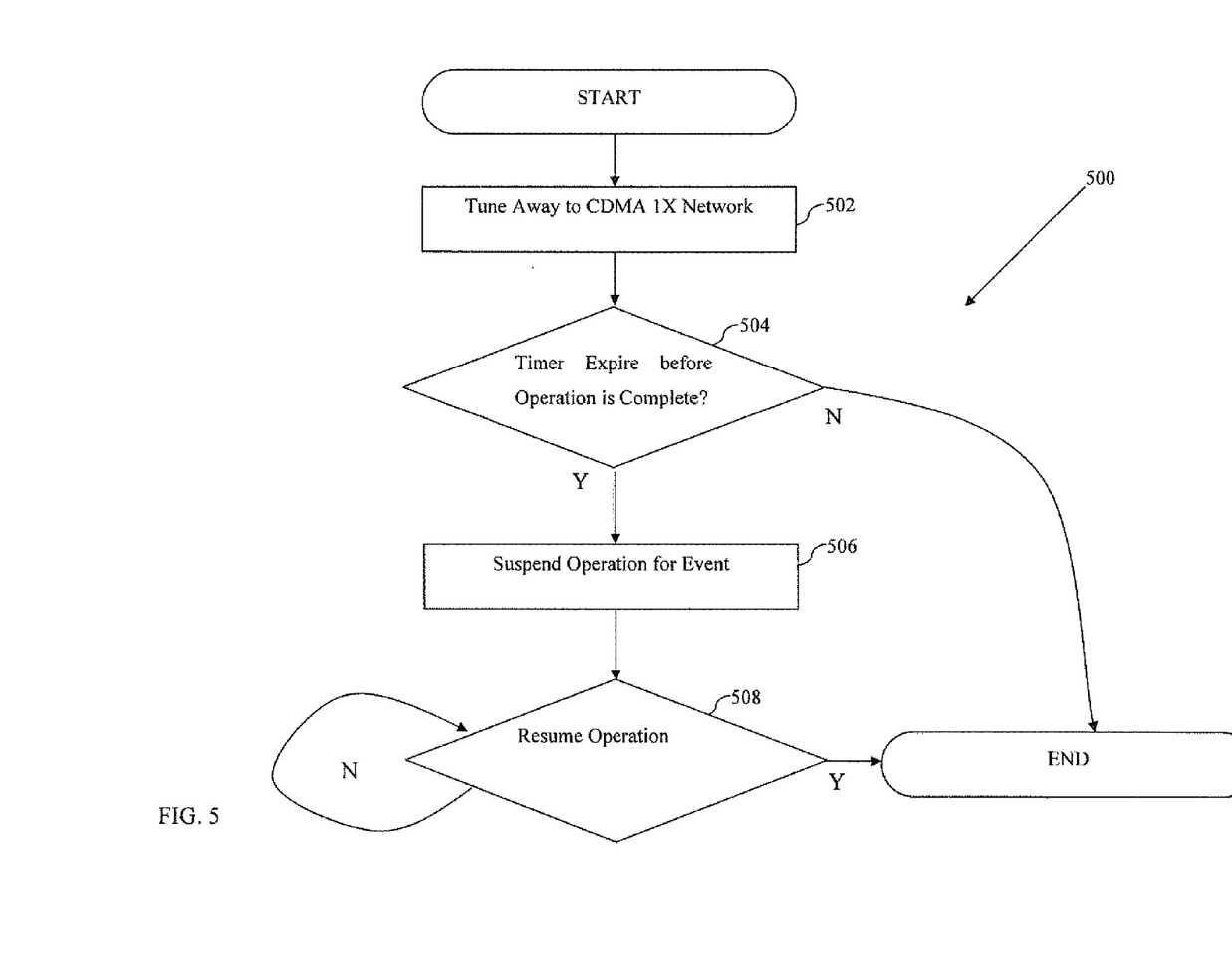
FIG. 5 is a logical flow diagram detailing one exemplary implementation of the method of FIG. 3 in the context of Long Term Evolution network and a Code Division Multiple Access 1X networks.

Referring now to FIG. 5, one exemplary implementation of the method 300 of FIG. 3 is shown and described. Specifically, one exemplary embodiment of a method 500 for synchronizing operational state during hybrid network operation is illustrated. In one scenario, the hybrid client device (user equipment (UE)) is a single-radio solution capable of communicating with a Long Term Evolution (LTE) network and Code Division Multiple Access 1X (CDMA 1X) network. While the following operation is described with reference to the evolved Node B (eNB) of the LTE network, it is readily appreciated that various embodiments of the present disclosure are widely applicable to base stations (regardless of technology), and more generally wireless server devices of any type (e.g., ad hoc networks, etc.)

Consider a scenario where a UE is registered with a first LTE network, and a second CDMA 1X network. The UE is intermittently transmitting and/or receiving data from the LTE network; and periodically the UE tunes away from the LTE network to check for CDMA 1X pages. The UE includes three (3) distinct software entities, a Call Management (CM) entity, a LTE Call Processing (CP) entity, and a CDMA 1X CP entity. During operation the CM switches the active network by switching to the corresponding CP entity (e.g., to access the LTE network the CM enables the LTE CP). It should be noted that both CP can be active simultaneously, even though the CM only enables one CP at a time. Moreover, in the following discussion, the LTE CP maintains the exemplary Radio Resource Connection (RRC) state machine 400 of FIG. 4. In particular, the UE's LTE CP maintains an RRC state machine with three (3) distinct states: RRC_IDLE 402, RRC_CONNECTED 404, and RRC_SUSPEND 406.

At step 502, the UE tunes to the CDMA 1X network to check for pages and/or perform one or more maintenance tasks (e.g., measurements, location area updates, etc.). Specifically, the CM enables the CDMA 1X CP entity, and disables the LTE CP entity (which remains active). When the CDMA 1X CP tunes to the CDMA 1X network, the CM begins a first timer. If the timer expires before the CDMA 1X CP has completed its tasks for the CDMA 1X network, then the CM will proceed to step 504. Otherwise, if the tasks are completed before the timer expires, then the CM can tune back to the LTE network normally (i.e., the CM disables the CDMA 1X CP entity (which remains active), and enables the LTE CP entity.

At step 504 of the method 500, if the CDMA 1X CP cannot return from CDMA 1X measurements before the CM's first timer expires, then the CM will halt the CDMA 1X CP operation and re-enable the LTE CP.

Responsive, at step 506 of the method 500, the LTE CP issues an extended service request to the LTE network. The extended service request puts the LTE connection into the RRC_SUSPEND state. Thereafter, the LTE CP returns to the CM.

At step 508 of the method 500, the CM can disable the LTE CP, and reinstates the CDMA 1X CP. The CDMA 1X CP can perform much longer tasks, without adverse effects on the LTE CP (i.e., the LTE network will not drop UE context due to a lack of response).

Apparatus—

Figure 6:
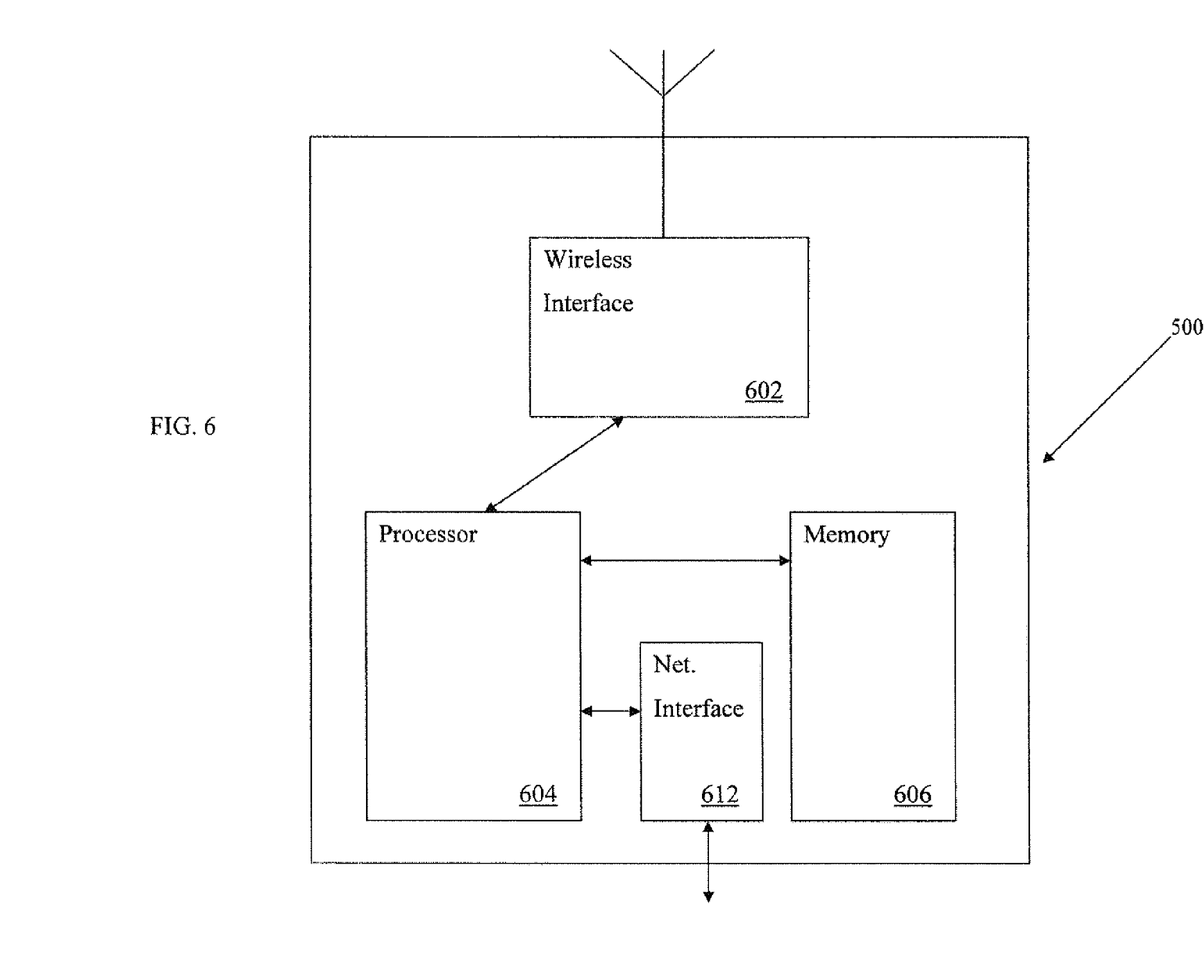
FIG. 6 is a functional block diagram of an exemplary embodiment of a wireless network apparatus useful for implementing several of the methods of the present disclosure.

FIG. 6 illustrates one exemplary embodiment of a network entity 600 configured in accordance with the present disclosure. The network entity may be a stand-alone entity, or be incorporated with other network entities (e.g., a base station, a base station controller, a radio access network controller, etc.). In one implementation, the network entity includes a Long Term Evolution (LTE) evolved Node B (eNB).

As shown in FIG. 6, the network entity 600 generally includes a wireless (e.g., cellular) interface 602 for interfacing with cellular devices, a processing apparatus 604, and a storage apparatus 606. The cellular interface is shown as a wireless cellular interface configured for communication with one or more mobile devices, although other configurations and functionalities may be substituted. For example, in one embodiment, the interface may be a wireline communication to a base station, where the base station is in communication with the mobile device.

The cellular interface 602 of the apparatus 600 shown in FIG. 6 at a high level includes one or more radio transceiver circuits configured to transmit and receive data via radio frequency transmissions (RF). Common embodiments of a radio transceiver generally include a modem processor, and one or more antennas. In one exemplary embodiment of the present disclosure, the radio transceiver is configured in accordance with Long Term Evolution radio access technologies. It is recognized that various other implementations of the present disclosure may be configured for other cellular and/or other wireless standards. Common examples of such technologies include: GSM, GPRS, EDGE, WCDMA, CDMA2000, CDMA 1X, CDMA 1X-EVDO, LTE-A, etc. and various combinations thereof.

The processing apparatus or 604 may include one or more processors (or multi-core processor(s)). Additionally, the processor is coupled to processing memory and/or the storage apparatus. Common implementations of the processing subsystem are implemented within signal processors, general processors, network processors, field programmable gate arrays (FPGAs), digital signal processors (DSPs), and any combination of the foregoing. Typical implementations of memory and storage apparatus include Random Access Memory (RAM) and variations thereof (dynamic RAM, static RAM, synchronous RAM, and/or other memory such as mobile low-power dynamic RAM (LPDRAM)), Flash memory, and Hard Disk Drives (HDD). Moreover, it is further appreciated that one or more memory apparatus may further be configured in various redundancy schemes (e.g., Redundant Arrays of Inexpensive Drives (RAID)), etc.

In one exemplary embodiment, the network entity 600 is further coupled to a wired network infrastructure via a network interface 612. The network interface is generally adapted for use with Ethernet networks, although other suitable network variations include Synchronous Optical Networking (SONET), Asynchronous Transfer Mode (ATM), MoCA, etc. Various forms of physical interface are widely used within the related arts, including for example Ethernet cable (e.g., CAT5 or CAT6), coaxial, fiber optics, etc.

In one exemplary embodiment, the network entity 600 is configured to suspend session state for a client device (such as the UE 200 of FIG. 2). During suspended operation, session context information is stored into memory for later retrieval. Common examples of session information include e.g., device status, connection status, currently active applications, application state, application history, application transactions, download history, upload history, etc. Once the network has suspended the client device, the network no longer needs to schedule or allocate resources for client device transactions.

Responsive to subsequent access by the client device (e.g., via a Random Access Channel (RACH), etc.), the network entity reviews its listing of suspended context, and if the client device has a suspended context, the client device and network may resume operation. In some cases, some additional verification may be used (e.g., a checksum, etc.) to verify that both the network entity and client device have current information.

It will be recognized that while certain embodiments of the disclosure are described in terms of a specific sequence of steps of a method, these descriptions are only illustrative of the broader methods disclosed herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the principles described and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the principles described herein. The foregoing description is of the best mode presently contemplated This description is in no way meant to be limiting, but rather should be taken as illustrative of the general principles of the disclosure. The scope of the disclosure should be determined with reference to the claims.

What is claimed is:

1. A method for operating a user equipment (UE) device in at least a first network, the method comprising:
   identifying an extended outage event;
   providing information regarding the extended outage event to the first network;
   suspending a session with the first network for a duration of the extended outage event; and
   resuming the session with the first network after the duration of the extended outage event;
   wherein the identification of the extended outage event is initiated by the UE device and is based on a timer that is started when the UE device tunes to a second network.

2. The method of claim 1, wherein the identifying the extended outage event is based at least in part on an operation of the UE device within the second network.

3. The method of claim 2, wherein the operation comprises at least one of:
   (i) a data transmission on the second network;
   (ii) a data reception on the second network; and
   (iii) a measurement of a functional parameter of the second network.

4. The method of claim 2, wherein the operation comprises at least one of:
   (i) a registration with the second network;
   (ii) a location area update with the second network;
   (iii) an access of a paging channel of the second network;
   (iv) a search operation associated with the second network;
   (v) a measurement of a cell parameter of the second network;
   (vi) a voice call between the UE device and the second network;
   (vii) an out of service procedure;
   (viii) a power measurement associated with the second network; and
   (ix) and overhead updates after moving to a different channel.

5. The method of claim 1, wherein responsive to the timer expiring, the UE device tunes back to the first network to provide the information regarding the extended outage event.

6. The method of claim 1, wherein the identification of the extended outage event is based on data that is communicated to the UE device via the second network.

7. The method of claim 1, wherein suspending the session with the first network comprises the UE device and the first network storing one or more device context information.

8. The method of claim 7, wherein the device context information comprises at least one of:
   (i) a UE device status;
   (ii) a UE connection status;
   (iii) one or more active applications of the UE device;
   (iv) one or more UE application states;
   (v) one or more UE application histories;
   (vi) one or more UE application transactions;
   (vii) one or more UE download histories; and
   (viii) one or more UE upload histories.

9. The method of claim 7, wherein resuming the session with the first network comprises the UE device and the first network restoring the stored one or more device context information.

10. A portable radio communications apparatus comprising:
    a processor;
    a timer, the timer configured to expire after a timer interval;
    a wireless interface; and
    a connection management logic in communication with the processor and the wireless interface and configured to execute an extended outage event process, the extended outage event process causing the portable radio communications apparatus to:
    communicate with a first network via a session;
    tune to a second network and start the timer; and
    when the timer expires:
      tune back to the first network;
      suspend the session with the first network for a duration of an extended outage event;
      communicate with a second network during the extended outage event; and
      thereafter, resume the session with the first network.

11. The portable radio communications apparatus of claim 10, wherein execution of the extended outage event process further causes the portable radio communications apparatus to identify the extended outage event is based at least in part on an operation of the portable radio communications apparatus within the second network.

12. The portable radio communications apparatus of claim 11, wherein the operation comprises at least one of:
    (i) a data transmission on the second network;
    (ii) a data reception on the second network; and
    (iii) a measurement of a functional parameter of the second network.

13. The portable radio communications apparatus of claim 11, wherein the operation comprises at least one of:
    (i) a registration with the second network;
    (ii) a location area update with the second network;

(iii) an access of a paging channel of the second network;
(iv) a search operation associated with the second network;
(v) a measurement of a cell parameter of the second network;
(vi) a voice call between the portable radio communications apparatus and the second network;
(vii) an out of service procedure;
(viii) a power measurement associated with the second network; and
(ix) and overhead updates after moving to a different channel.

14. The portable radio communications apparatus of claim 11, wherein the identification of the extended outage event is based on data that is communicated to the portable radio communications apparatus via the second network.

15. The portable radio communications apparatus of claim 10, wherein suspending the session with the first network comprises the portable radio communications apparatus and the first network storing one or more device context information.

16. The portable radio communications apparatus of claim 15, wherein the device context information comprises at least one of:
(i) a device status of the portable radio communications apparatus;
(ii) a connection status of the portable radio communications apparatus;
(iii) one or more active applications of the portable radio communications apparatus;
(iv) one or more application states of the portable radio communications apparatus;
(v) one or more application histories of the portable radio communications apparatus;
(vi) one or more application transactions of the portable radio communications apparatus;
(vii) one or more download histories of the portable radio communications apparatus; and
(viii) one or more upload histories of the portable radio communications apparatus.

17. The portable radio communications apparatus of claim 15, wherein resuming the session with the first network comprises the portable radio communications apparatus and the first network restoring the stored one or more device context information.

18. A non-transitory computer-readable medium comprising a plurality of computer-readable instructions stored thereon, the plurality of computer-readable instructions configured to, when executed by a processor, cause a mobile device to:
establish a communications session with a first network;
while the communications session is active, tune to a second network; and
when an extended outage event occurs while the mobile device is tuned to the second network:
provide information regarding the extended outage event to the first network;
suspend the communications session with the first network; and
when the extended outage event finishes, resume the suspended communications session with the first network.

19. The non-transitory computer-readable medium of claim 18, wherein execution of the computer-readable instructions by the processor further causes the mobile device to identify the extended outage event based at least in part on an operation of the mobile device within the second network.

20. The non-transitory computer-readable medium of claim 19, wherein the operation comprises at least one of:
(i) a data transmission on the second network;
(ii) a data reception on the second network; and
(iii) a measurement of a functional parameter of the second network.

21. The non-transitory computer-readable medium of claim 19, wherein the operation comprises at least one of:
(i) a registration with the second network;
(ii) a location area update with the second network;
(iii) an access of a paging channel of the second network;
(iv) a search operation associated with the second network;
(v) a measurement of a cell parameter of the second network;
(vi) a voice call between the mobile device and the second network;
(vii) an out of service procedure;
(viii) a power measurement associated with the second network; and
(ix) and overhead updates after moving to a different channel.

22. The non-transitory computer-readable medium of claim 19, wherein the identification of the extended outage event is based on data that is communicated to the mobile device via the second network.

23. The non-transitory computer-readable medium of claim 18, wherein suspending the communication session with the first network comprises the mobile device and the first network storing one or more device context information.

24. The non-transitory computer-readable medium of claim 23, wherein the device context information comprises at least one of:
(i) a mobile device status;
(ii) a connection status of the mobile device;
(iii) one or more active applications of the mobile device;
(iv) one or more application states of the mobile device;
(v) one or more application histories of the mobile device;
(vi) one or more application transactions of the mobile device;
(vii) one or more download histories of the mobile device; and
(viii) one or more upload histories of the mobile device.

25. The non-transitory computer-readable medium of claim 23, wherein resuming the suspended communications session comprises the mobile device and the first network restoring the stored one or more device context information.

* * * * *

UNITED STATES PATENT AND TRADEMARK OFFICE
CERTIFICATE OF CORRECTION

PATENT NO. : 8,868,130 B2
APPLICATION NO. : 13/860406
DATED : October 21, 2014
INVENTOR(S) : Sarma V. Vangala et al.

Page 1 of 1

It is certified that error appears in the above-identified patent and that said Letters Patent is hereby corrected as shown below:

In the Claims:

Column 18, line 19 (Claim 8, line 1): "the device" should read --the one or more device--.

Column 19, line 22 (Claim 16, line 2): "the device" should read --the one or more device--.

Column 20, line 40 (Claim 24, line 2): "the device" should read --the one or more device--.

Signed and Sealed this
Sixth Day of January, 2015

Michelle K. Lee
*Deputy Director of the United States Patent and Trademark Office*